US010268777B2

(12) United States Patent
Bik et al.

(10) Patent No.: US 10,268,777 B2
(45) Date of Patent: *Apr. 23, 2019

(54) DATA BACKUP IN A GRAPH PROCESSING SYSTEM

(71) Applicant: Google LLC, Mountain View, CA (US)

(72) Inventors: Aart J. C. Bik, Union City, CA (US); James C. Dehnert, Palo Alto, CA (US); Matthew H. Austern, Palo Alto, CA (US); Grzegorz Czajkowski, Redwood City, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/822,553

(22) Filed: Aug. 10, 2015

(65) Prior Publication Data

US 2018/0285477 A1 Oct. 4, 2018

Related U.S. Application Data

(63) Continuation of application No. 13/451,420, filed on Apr. 19, 2012, now Pat. No. 9,104,665.

(Continued)

(51) Int. Cl.
| | |
|---|---|
| *G06F 11/14* | (2006.01) |
| *G06F 17/30* | (2006.01) |
| *G06F 9/46* | (2006.01) |
| *G06F 8/41* | (2018.01) |
| *G06F 15/173* | (2006.01) |
| *G06N 99/00* | (2019.01) |

(Continued)

(52) U.S. Cl.
CPC ........ *G06F 17/30958* (2013.01); *G06F 8/457* (2013.01); *G06F 9/46* (2013.01); *G06F 9/5005* (2013.01); *G06F 11/1451* (2013.01); *G06F 11/1464* (2013.01); *G06F 11/1469* (2013.01); *G06F 15/17312* (2013.01); *G06F 17/30* (2013.01); *G06F 17/30339* (2013.01);
(Continued)

(58) Field of Classification Search
None
See application file for complete search history.

(56) References Cited

U.S. PATENT DOCUMENTS

| | | | |
|---|---|---|---|
| 4,665,520 A | 5/1987 | Strom et al. | |
| 5,440,726 A | 8/1995 | Fuchs et al. | |

(Continued)

OTHER PUBLICATIONS

Anderson, T., et al., "High-Speed Switch Scheduling for Local-Area Networks," ACM Trans. Comp. Syst. 11(4): 319-352, 1993.

(Continued)

*Primary Examiner* — Rehana Perveen
*Assistant Examiner* — Raheem Hoffler
(74) *Attorney, Agent, or Firm* — Fish & Richardson P.C.

(57) ABSTRACT

Data are received at a worker system in a distributed computing system that describe a graph representing relationships among a set of items. The graph models a condition having an associated problem. The graph has graph components having associated data fields. The received data are stored in a backup table, and the relationships are analyzed to identify a solution to the problem. As part of the analysis, a new value for the data field associated with a graph component is identified and compared with an existing value of the data field, and the data field is modified. The modified data field is stored in a delta table representing a change to the backup table.

17 Claims, 10 Drawing Sheets

Related U.S. Application Data

(60) Provisional application No. 61/483,183, filed on May 6, 2011, provisional application No. 61/477,559, filed on Apr. 20, 2011.

(51) Int. Cl.
| | |
|---|---|
| *H04L 5/00* | (2006.01) |
| *H04L 29/08* | (2006.01) |
| *G06T 11/20* | (2006.01) |
| *G06F 9/50* | (2006.01) |
| *G06F 11/20* | (2006.01) |
| *G06F 7/00* | (2006.01) |

(52) U.S. Cl.
CPC ........... *G06N 99/00* (2013.01); *G06N 99/005* (2013.01); *G06T 11/206* (2013.01); *H04L 5/0032* (2013.01); *H04L 29/08135* (2013.01); *H04L 67/10* (2013.01); *G06F 7/00* (2013.01); *G06F 11/1448* (2013.01); *G06F 11/2082* (2013.01); *G06F 17/30575* (2013.01); *G06F 17/30961* (2013.01); *G06F 2201/84* (2013.01); *G06F 2221/0793* (2013.01); *G06T 2210/32* (2013.01)

(56) References Cited

U.S. PATENT DOCUMENTS

| | | | |
|---|---|---|---|
| 5,734,833 | A | 3/1998 | Chiu et al. |
| 6,393,583 | B1 | 5/2002 | Meth et al. |
| 6,397,351 | B1* | 5/2002 | Miller ................. G06F 11/1469 714/13 |
| 6,823,474 | B2 | 11/2004 | Kampe et al. |
| 7,392,258 | B2 | 6/2008 | Bogner et al. |
| 8,250,405 | B2 | 8/2012 | Elnozahy |
| 8,429,110 | B2 | 4/2013 | Cai et al. |
| 8,433,951 | B1 | 4/2013 | Havemose et al. |
| 8,458,229 | B2 | 6/2013 | Oliver et al. |
| 8,566,326 | B2 | 10/2013 | Hu et al. |
| 8,880,931 | B2 | 11/2014 | Sun |
| 9,367,579 | B1* | 6/2016 | Kumar ............. G06F 17/30371 |
| 2002/0067720 | A1 | 6/2002 | Garcia-Luna-Aceves et al. |
| 2006/0031509 | A1 | 2/2006 | Ballette et al. |
| 2006/0212860 | A1 | 9/2006 | Benedikt et al. |
| 2006/0268879 | A1 | 11/2006 | Xhafa et al. |
| 2007/0277056 | A1 | 11/2007 | Varadarajan et al. |
| 2008/0195577 | A1 | 8/2008 | Fan et al. |
| 2008/0216077 | A1 | 9/2008 | Emani |
| 2008/0271022 | A1 | 10/2008 | Strassner et al. |
| 2009/0027392 | A1 | 1/2009 | Jadhav et al. |
| 2009/0044180 | A1 | 2/2009 | Luszczek et al. |
| 2009/0055343 | A1 | 2/2009 | Van Lunteren |
| 2010/0017537 | A1 | 1/2010 | Linnartz et al. |
| 2010/0042676 | A1 | 2/2010 | Seroussi et al. |
| 2010/0241827 | A1 | 9/2010 | Yu et al. |
| 2010/0250517 | A1 | 9/2010 | Bendel et al. |
| 2011/0035359 | A1* | 2/2011 | Bendakovsky ..... G06F 11/1458 707/640 |
| 2011/0040808 | A1* | 2/2011 | Joy ........................... G06F 8/20 707/812 |
| 2011/0167425 | A1* | 7/2011 | Lurie .................... G06F 9/5072 718/102 |
| 2011/0307436 | A1 | 12/2011 | Cai |
| 2011/0314075 | A1 | 12/2011 | Boldyrev et al. |
| 2012/0233172 | A1 | 9/2012 | Skillcorn et al. |
| 2012/0254254 | A1 | 10/2012 | Milousheff |

OTHER PUBLICATIONS

Bader, D., et al., "Designing Multithreaded Algorithms for Breadth-First Search and st-connectivity on the Cray MTA-2," in Proc. 35th Intl. Conf. on Parallel Processing (ICPP'06), Columbus, Ohio, Aug. 2006, pp. 523-530.

Barroso, L., et al., "Web search for a planet: The Google Cluster Architecture," IEEE Micro 23(2):22-28, 2003.

Bayati, M., et al., "Maximum Weight Matching via Max-Product Belief Propagation," in Proc. IEEE Intl. Symp. on Information Theory, pp. 1763-1767, 2005.

Bellman, R., "On a routing problem," Quarterly of Applied Mathematics 16(1 ):87-90, 1958.

Bonorden et al., "The Paderborn University BSP (PUB) library," Parallel Computing 29:187-207, 2003.

Brin, S., et al., "The Anatomy of a Large-Scale Hypertextual Web Search Engine," in Proc. 7th Intl. Conf. on the World Wide Web, DD. 107-117, 1998.

Chan, A., et al., "CGMGRAPH/CGMLIB: Implementing and Testing CGM Graph Algorithms on PC Clusters and Shared Memory Machines," Intl. J. of High Performance Computing Applications 19(1 ):81-97, 2005.

Chang, F., et al., "Bigtable: A Distributed Storage System for Structured Data," ACM Trans. Comp. Syst. 26(2) Article 4, 26 pages, 2008.

Cherkassky, B., et al., "Shortest paths algorithms: Theory and experimental evaluation," Mathematical Programming 73:129-174, 1996.

Cohen, J., "Graph Twiddling in a MapReduce World," Comp. in Science & Engineering, pp. 29-41, Jul./Aug. 2009.

Crobak, J., et al., "Advanced Shortest Paths Algorithms on a Massively-Multithreaded Architecture," in Proc. First Workshop on Multithreaded Architectures and Applications, pp. 1-8, 2007.

Czajkowski, G., "Large-scale graph computing at Google," Google Research Admin., Jun. 2009, 1 page, [online] [retrieved Jul. 20, 2012] retrieved from the internet <http://googleresearch.blogspot.com/2009/06/large-scale-graph-computing-at-google.html>.

Daly, J., "A higher order estimate of the optimum checkpoint interval for restart dumps," Future Generation Computer Systems 22:303-312, 2006.

Dean, J., et al., "MapReduce: Simplified Data Processing on Large Clusters," in Proc. 6th USENIX Symp. On Operating Syst. Design and Imp/., pp. 137-150, 2004.

Dijkstra, E., et al., "A Note on Two Problems in Connexion with Graphs," Numerische Mathematik 1:269-271, 1959.

Erwig, M., "Inductive graphs and functional graph algorithms," J. Functional Programming 11(5):467-492, Sep. 2001.

Ghemawat, S., et al., "The Google File System," in Proc. 19th ACM Symp. On Operating Syst. Principles, pp. 29-43, 2003.

Google Project Hosting, "Protobuf: Protocol Buffers—Google's data interchange format," 2 pages, [online] retrieved Jul. 20, 20121 retrieved from the internet <http://code.google.com/p/protobuf/ 2009>.

Goudreau, M., et al., "Portable and Efficient Parallel Computing Using the BSP Model," IEEE Transactions on Computers 48(7): 670-689, 1999.

Gregor, D., et al., "Lifting Sequential Graph Algorithms for Distributed-Memory Parallel Computation," in Proc. Of Parallel Object-Oriented Scientific Computing (POOSC), 15 pages, Jul. 2005.

Gregor, D., et al., "The Parallel BGL: A Generic Library for Distributed Graph Computations," in Proc. 2005 ACM S/GPLAN Conf. on Object-Oriented Prag., Syst., Lang., and Applications (OOPSLA'05), pp. 423-437, Oct. 2005.

Hagberg, A., et al., "Exploring Network Structure, Dynamics, and Function using NetworkX," in Proc. 7th Python in Science Conf., pp. 11-15, 2008.

Hill, J., et al., "BSPlib: The BSP programming library," Parallel Computing 24:1947-1980, 1998.

Isard, M., et al., "Dryad: Distributed Data-Parallel Programs from Sequential Building Blocks," in Proc. European Conf. on Computer Syst., pp. 59-72, 2007.

Kang, U., et al., "PEGASUS: A Peta-Scale Graph Mining System—Implementation and Observations," in Proc. Intl. Conf. Data Mining, pp. 229-238, 2009.

Lumsdaine, A., et al., "Challenges in Parallel Graph Processing," Parallel Processing Letters 17:5-20, 2007.

Madduri, K., et al., "A Faster Parallel Algorithm and Efficient Multithreaded Implementations for Evaluation Betweenness Cen-

(56) References Cited

OTHER PUBLICATIONS trality on Massive Datasets," in Proc. $3^{rd}$ Workshop on Multithreaded Architectures and Applications (MTAAP'09), Rome, Italy, May 2009, 8 pages.

Madduri, K., et al., "Parallel Shortest Path Algorithms for Solving Large-Scale Instances," DIMACS Implementation Challenge—The Shortest Path Problem, 39 pages, 2006.

Malewicz, G., "A Work-Optimal Deterministic Algorithm for the Certified Write-All Problem with a Nontrivial Number of Asynchronous Processors," SIAM J. Comput. 34(4):993-1024, 2005.

Malewicz, G., et al., "Pregel: A System for Large-Scale Graph Processing," in Comm. ACM SIGMOD/POD, Indianapolis, Indiana, Jun. 6-10, 2010, 11 pages.

Meyer, U., et al., "Design and Implementation of a Practical I/0-efficient Shortest Paths Algorithm," in Proc. 3rd Workshop on Multithreaded Architectures and Applications (MTAAP'09), Rome, Italy, May 2009, 12 pages.

Meyer, U., et al., "l1-stepping: a parallelizable shortest path algorithm," Journal of Algorithms 49:114-152, 2003.

Munagala, K., et al., "1/0-Complexity of Graph Algorithms," in Proc. $10^{th}$ Annual ACM-SIAM Symp. On Discrete Algorithms, pp. 687-694, 1999.

Olston, C., et al., "Pig Latin: A Not-So-Foreign Language for Data Processing," in Proc. ACM SIGMOD Intl. Conf. on Management of Data, pp. 1099-1110, 2008.

Pike, R., et al., "Interpreting the data: Parallel analysis with Sawzall," Scientific Programming 13(4):277-298, 2005.

Thorup, M., "Undirected Single-Source Shortest Paths with Positive Integer Weights in Linear Time," J. ACM 46(3):362-394, May 1999.

Valiant, L., "A Bridging Model for Parallel Computation," Comm. ACM 33(8):103-111, 1990.

Wikipedia, "Bulk synchronous parallel," 3 pages, [online] [retrieved on Mar. 10, 2010] retrieved from the internet <http://en.wikipedia.org/w/index.php?title=Bulk_synchronous_parallel&oldid=349030784>.

Wikipedia, "Distributed computing," 8 pages, [online] [retrieved Mar. 23, 2010] retrieved from the internet <http://en.wikipedia.org/w/index.php?title=Distributed_computing&oldid=351626983>.

Yoo, A., et al., "A Scalable Distributed Parallel Breadth-First Search Algorithm on BlueGene/L," in Proc. 2005 ACM/IEEE Conf. on Supercomputing (SC'05), pp. 25-43, 2005.

Yu, Y., et al., "DryadLINQ: A System for General Purpose Distributed Data-Parallel Computing Using a High-Level Language," in Proc. $8^{th}$ USENIX Symp. On Operating Syst. Design and Implementation, pp. 10-14, 2008.

Ziv, A., et al., "An On-Line Algorithm for Checkpoint Placement," IEEE Transactions on Computers 46(9):976-985, Sep. 1997.

Kang, F., et al., "Correlated Label Propagation with Application to Multi-label Learning," Proceedings of the 2006 IEEE Computer Society Conference on Computer Vision and Pattern Recognition (CVPR'06), 2006, pp. 1719-1726.

Rao, D., et al., "Ranking and Semi-supervised Classification on Large Scale Graphs Using Map-Reduce," Proceedings of the 2009 Workshop on Graph-based Methods of Natural Language Processing, ACL-IJCNLP 2009, pp. 58-65.

\* cited by examiner

DATA BACKUP IN A GRAPH PROCESSING SYSTEM

CROSS-REFERENCE TO RELATED APPLICATIONS

This application is a continuation of and claims the benefit of priority to U.S. application Ser. No. 13/451,420, filed Apr. 19, 2012 which claims priority to U.S. Provisional Application No. 61/477,559, filed Apr. 20, 2011, and U.S. Provisional Application No. 61/483,183, filed May 6, 2011, the contents of which are hereby incorporated by reference.

BACKGROUND

Technical Field

This invention pertains in general to distributed computing and in particular to graph processing using a distributed computer system.

Background Information

A distributed computing system includes multiple autonomous computers that communicate through a network. The computers interact with each other via the network to solve a common problem. For example, a complex problem can be divided into many smaller, less complex problems, and solved in parallel by the multiple computers in the distributed system.

Graph processing is a type of problem that is well-suited for solving using distributed systems. In graph processing, a computing problem is represented by a graph having a set of vertices connected by a set of edges. The graph can be used to model a real-world condition, and then the graph processing can act on the graph to analyze the modeled condition. For example, the World Wide Web can be represented as a graph where web pages are vertices and links among the pages are edges. In this example, graph processing can analyze the graph to provide information to a search engine process that ranks search results. Similarly, a social network can be represented as a graph and graph processing can analyze the graph to learn about the relationships in the social network. Graphs can also be used to model transportation routes, paths of disease outbreaks, citation relationships among published works, and similarities among different documents.

Efficient processing of large graphs is challenging. Graph processing often exhibits poor locality of memory access, very little work per vertex, and a changing degree of parallelism over the course of execution. Distribution over many computers exacerbates the locality issue, and increases the probability that a computer will fail during computation. These challenges continue to occur and are growing in significance as graph processing is used to model more real-world conditions and the sizes of the graphs increase.

SUMMARY

The above and other needs are met by a method, a non-transitory computer-readable storage medium and a system for maintaining and modifying graph data. Embodiments of the method comprise receiving data at a worker system in a distributed computing system comprising a plurality of worker systems. The data describe a graph representing relationships among items. The graph models a condition that has an associated problem and the graph has graph components with associated data fields. The received data is stored in backup table, and the relationships among the items are analyzed to identify a solution to the problem. The analysis includes identifying a request to change a data field associated with a graph component responsive to an operation performed during the analysis. The request includes a new value for the data field. The new value is compared with an existing value of the data field associated with the graph component. The data field in the distributed computing system is modified based on the comparison, and responsive to modification of the data field, the modified data is stored in a delta table.

Embodiments of the non-transitory computer-readable storage medium store executable computer program instructions. The computer program instructions include instructions for receiving data at a worker system in a distributed computing system comprising a plurality of worker systems. The data describe a graph representing relationships among items. The graph models a condition that has an associated problem and the graph has graph components with associated data fields. The computer program instructions further include instructions for storing the received data in a backup table and analyzing the relationships among the items to identify a solution to the problem. The analysis includes identifying a request to change a data field associated with a graph component responsive to an operation performed during the analysis. The request includes a new value for the data field. The analysis further includes comparing the new value with an existing value of the data field associated with the graph component. The analysis further includes modifying the data field in the distributed computing system based on the comparison. Additionally, the program instructions further include instructions for storing the modified data in a delta table responsive to modification of the data field.

Embodiments of the system comprise a processor and a non-transitory computer readable storage medium storing processor-executable computer program instructions. The computer program instructions include instructions for receiving data at a worker system in a distributed computing system comprising a plurality of worker systems. The data describes a graph representing relationships among items. The graph models a condition that has an associated problem and the graph has graph components with associated data fields. The computer program instructions further include instructions for storing the received data in a backup table and analyzing the relationships among the items to identify a solution to the problem. The analysis includes identifying a request to change a data field associated with a graph component responsive to an operation performed during the analysis. The request includes a new value for the data field. The analysis further includes comparing the new value with an existing value of the data field associated with the graph component. The analysis further includes modifying the data field in the distributed computing system based on the comparison. Additionally, the program instructions further include instructions for storing the modified data in a delta table responsive to modification of the data field.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The figures depict embodiments of the present invention for purposes of illustration only. One skilled in the art will readily recognize from the following description that alternative embodiments of the structures and methods illustrated herein may be employed without departing from the principles of the invention described herein.

DETAILED DESCRIPTION

Figure 1:
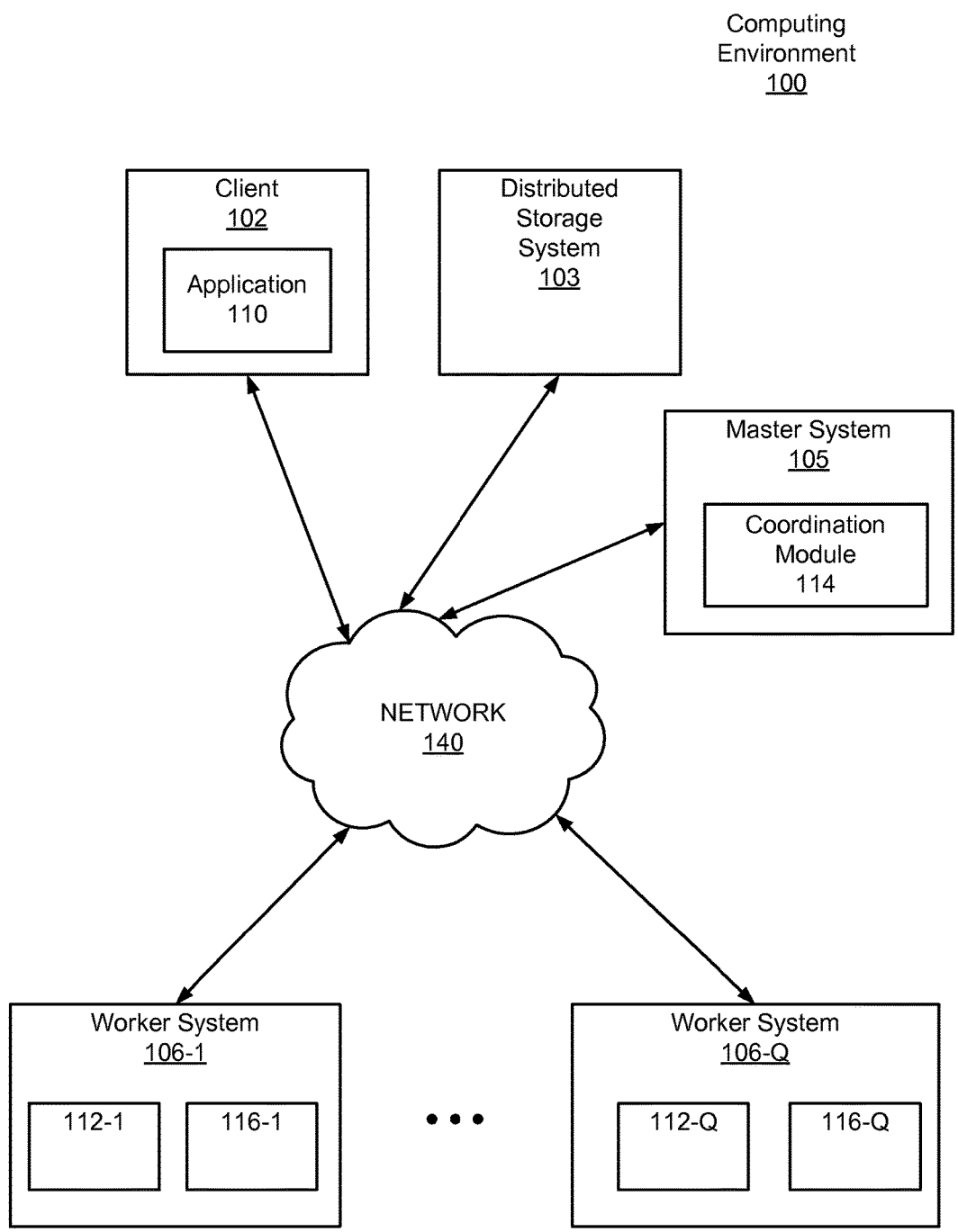
FIG. 1 is a high-level block diagram of a computing environment, according to one embodiment.

FIG. 1 is a high-level block diagram of a computing environment 100 for performing scalable fault-tolerant processing of large scale graphs. FIG. 1 illustrates a client 102, a master system 105, a distributed storage system 103, and worker systems 106 connected by a network 140. Collectively, the computing environment 100 is used to define a graph modeling real-world conditions as a set of relationships among a tangible set of items, such as documents and links on the Internet, transportation routes, or a social graph. In addition, the computing environment 100 is used to analyze the modeled conditions in order to solve one or more real-world problems associated with the conditions. This analysis may apply one or more algorithms to the graph, such as algorithms for shortest path computations, clustering, web page ranking, graph cutting, etc.

At a high-level, the client 102 is used to provide the location of graph data describing the graph and to specify an algorithm to be performed on the graph data. The graph data describing the graph may be stored on the distributed storage system 103. The graph itself is represented as a set of vertices connected by a set of directed edges. In one embodiment, the set of edges in the graph may not be directed. As used herein, the vertices and the edges of a graph are collectively referred to as graph components. The master system 105 assigns partitions of the graph data to the worker systems 106. The worker systems 106 receive the graph data for their respective partitions and store the graph data in their non-volatile memory. The worker systems 106 also store part or all of the received graph data in volatile memory and perform the specified algorithm on the graph data in volatile memory. The worker systems 106 repeatedly store the modified graph data resulting from the performed algorithm in non-volatile memory and, in one embodiment, may later use the stored data in non-volatile memory to recover from a failure.

In more detail, the client 102 specifies a graph in which each vertex is uniquely identified by a string vertex identifier. For example, the client 102 may provide information identifying the location of the graph on the distributed storage system 103 that is connected to the network 104. Each vertex is also associated with a modifiable, user-defined value. The edges are associated with their source vertices, and each edge has a modifiable, user-defined value and a target vertex identifier. The worker systems 106 communicate on behalf of their vertices and send messages on behalf of one vertex to another, each of which includes a message value and the name of the destination vertex. In some embodiments, worker systems 106 send requests for one vertex to other vertices to add, modify or remove vertices and edges.

A possible computation includes initialization of a graph and execution of the algorithm on multiple worker systems 106. The algorithm includes a defined function that is repeatedly executed in a sequence of supersteps separated by global synchronization points until the algorithm terminates and produces an output. Within each superstep, the worker systems 106 compute in parallel, each executing the defined function for all of the active vertices in respective partitions of the worker systems 106. A worker system 106 can modify a vertex's state or that of the vertex's outgoing edges, receive messages for a vertex sent to the vertex in the previous superstep, send messages on behalf of a vertex to other vertices (to be received in the next superstep), or even mutate the topology of the graph.

The algorithm terminates based on the worker systems 106 voting to halt on behalf of all its vertices. In superstep 0 (the initial superstep), every vertex is in the active state; all active vertices participate in the computation of any given superstep. A worker system 106 deactivates a vertex by voting to halt the vertex. Halting means that the vertex has no further work to do unless triggered externally, and that the worker system 106 will not perform the defined function for the halted vertex in subsequent supersteps unless the worker system 106 receives a message for the halted vertex. If a halted vertex is reactivated by a message, the worker system 106 must explicitly deactivate the halted vertex again. The algorithm as a whole terminates when all vertices are simultaneously inactive and there are no messages in transit.

The output of the algorithm is a set of values output by the worker systems 106 for the vertices. For example, a clustering algorithm might generate a small set of disconnected vertices selected from a large graph. In another example, a graph mining algorithm might simply output aggregated statistics mined from the graph. The output represents a solution to the real-world problem associated with the modeled conditions involving the set of relationships among the set of items. For example, the output might be a set of search results, a transportation route, an analysis of the spread of a disease, or a recommendation for an item.

Turning now to the specific entities illustrated in FIG. 1, the client 102 is a computing device with a processor and a memory that includes an application 110 for providing the master system 105 with a user program and the location of the graph data. The user program defines the algorithm to perform on the graph data. An example of the algorithm is a shortest path algorithm that finds a shortest path between a single source vertex and every other vertex in the graph.

The application 110 sends a copy of the user program to the master system 105. The application 110 also sends graph data or a location of the graph data to the master system 105.

The distributed storage system 103 includes one or more computing devices that may store the graph data. The distributed storage system 103 may provide the graph data to the systems connected to network 104 (i.e., client 102, master system 105, and worker system 106). In some embodiments, the graph data is stored as a plurality of graph partitions, where a graph partition stores data describing a subset of the edges and vertices of a graph. In one embodiment, the distributed storage system 103 stores a file for each graph partition. In another embodiment, the distributed system 103 stores a file per each graph partition including the output for a computation from the vertices of the partition.

The master system 105 is a computing device with a processor and a memory. The master system 105 receives graph data (or location of the graph data) and a user program from the client 102, assigns partitions of the graph data to the worker systems 106, provides copies of the user program to the worker systems 106, coordinates the parallel execution of the user program on the worker systems 106 and reports results of the execution to the client 102. The master system 105 includes a coordination module 114 that executes a copy of the user program that acts as a master or coordinator for the execution of the copies of the user program on the worker systems 106.

The coordination module 114 maintains a list of worker systems 106 that participate in a computation. The worker systems 106 send registration messages to the master system 105 and the coordination module 114 registers the worker systems 106 by assigning unique identifiers to the worker systems 106. The coordination module 114 maintains a list of the registered worker systems 106 which includes the identifiers of the registered worker systems 106 and the addressing information of the registered worker systems 106. For a respective registered worker system 106, the list includes information identifying one or more assigned graph partitions. In some embodiments, the coordination module 114 sends each worker system 106 the list of the registered worker systems 106.

The coordination module 114 determines the number of partitions the graph will have, assigns one or more partitions to each worker system 106 and sends each worker system 106 its assigned one or more partitions (or information identifying the assigned one or more partitions). A partition of a graph includes a subset of the vertices and edges of the graph. The number of partitions may be specified in the user program or determined by a partition function stored in the coordination module 114. For example, the default partitioning function may be a hash of a vertex identifier modulo N, where N is the number of partitions. The master system 105 is not assigned any portion of the graph.

The coordination module 114 sends each worker system 106 a copy of the user program and initiates the execution of the user program on the worker systems 106. More specifically, the coordination module 114 signals the beginning of a superstep. The coordination module 114 maintains statistics about the progress of a computation and the state of the graph, such as the total size of the graph, the number of active vertices, and the timing and message traffic of recent supersteps.

The coordination module 114 also handles fault tolerance. Fault tolerance is achieved through checkpointing. At the beginning or at another point of a superstep, the coordination module 114 instructs the worker systems 106 to save the state of their partitions to their persistent storages, including vertex identifiers, vertex values, edge lists, and incoming messages for the vertices in their partitions. In one embodiment, the worker systems 106 also save the states of their partitions to a persistent storage external to the worker systems 106.

Worker failures are detected through messages that the coordination module 114 periodically exchanges with the worker systems 106. If the coordination module 114 does not receive a reply message from a worker system 106 after a specified interval, the coordination module 114 marks that worker system 106 as failed. If a worker system 106 does not receive a message from the coordination module 114 after specified time interval, the worker system 106 terminates its processing. When a worker system 106 fails, the current state of the partitions assigned to the worker system 106 is lost. In order to recover from a worker system 106 failure, the failed worker system 106 retrieves the most recent current state from its persistent storage. If the worker system 106 cannot recover, the coordination module 114 reassigns graph partitions to the currently available set of worker systems 106 at the beginning of a superstep. The available set of worker systems 106 reload their partition states from the most recent available checkpoint at the beginning of a superstep. The worker systems 106 may reload part or all of their partition states from their own persistent storage or the external persistent storage. The most recent available checkpoint may be several supersteps earlier than the latest superstep completed by any worker system 106 before the failure, which results in the missing supersteps being repeated. The frequency of checkpointing may be based on a mean time of failure which thereby balances checkpointing cost against expected recovery cost.

After the supersteps are finished, the coordination module 114 aggregates results from the worker systems 106 and sends the results to the client 102 or the distributed storage system 103. In some embodiments, the results include a set of values explicitly output by the vertices. In some embodiments, the results include a graph.

A worker system 106 is a computing device with a processor and a memory. The worker systems 106 and the master system 105 are similar types of systems in one embodiment. A worker system 106 includes a worker module 112 and a backup database 116. The worker module 112 receives from the master system 105 the graph data for one or more partitions (or receives the location of the graph data from the master system 105 and retrieves the graph data from the received location) and stores the received data in the backup database 116. The worker module 112 also stores and executes a copy of the user program on the one or more partitions stored on the worker system 106.

The worker module 112 executes supersteps of a user program in response to receiving instructions from the master system 105. During a superstep, the worker module 112 executes a defined function for each active vertex in the one or more partitions stored on the worker module 112. A vertex that is active during a superstep may send messages to other vertices in order to obtain information about other vertices or edges, to add or remove vertices or edges and to modify vertices or edges. The vertex also receives messages from other vertices for similar reasons during a superstep. In one embodiment, messages received in one superstep provide data used by the defined function executed in the next superstep. Additionally, a received message activates a previously deactivated vertex that receives the message. When the superstep is finished, the worker module 112 sends a message to the master system 105 indicating the number of vertices that will be active in the next superstep. The superstep continues as long as there are active vertices or there are messages in transit. When the supersteps are finished, the worker module 112 sends the results generated from the user program to the master system 105.

The worker module 112 stores the state of vertices in its assigned one or more partitions to the backup database 116 and alternatively or additionally to an external storage. The worker module 112 stores the state of its vertices each time a backup threshold is reached. The backup threshold may be configured to be reached at the beginning or end of a superstep, or based on an amount of state data accumulated by the worker module 112 after the initial storage of state data. In one embodiment, the worker module 112 initially stores state data for all the vertices in its partitions and subsequently stores state data for vertices with modified state data. The state data for each vertex includes a unique identifier for the vertex, a vertex value, an edge list including data for the vertex's outgoing edges (the data for each outgoing edge including a unique identifier for the edge's destination and the destination's value), a queue containing incoming messages, and a flag specifying whether the vertex is active.

The network 140 represents the communication pathways between the client 102, the master system 105 and the worker systems 106. In one embodiment, the network 140 uses standard Internet communications technologies and/or protocols. Thus, the network 140 can include links using technologies such as Ethernet, IEEE 802.11, integrated services digital network (ISDN), asynchronous transfer mode (ATM), etc. Similarly, the networking protocols used on the network 140 can include the transmission control protocol/Internet protocol (TCP/IP), the hypertext transport protocol (HTTP), the simple mail transfer protocol (SMTP), the file transfer protocol (FTP), etc. The data exchanged over the network 140 can be represented using technologies and/or formats including the hypertext markup language (HTML), the extensible markup language (XML), etc. In addition, all or some links can be encrypted using conventional encryption technologies such as the secure sockets layer (SSL), Secure HTTP (HTTPS) and/or virtual private networks (VPNs). In another embodiment, the entities can use custom and/or dedicated data communications technologies instead of, or in addition to, the ones described above.

Figure 2:
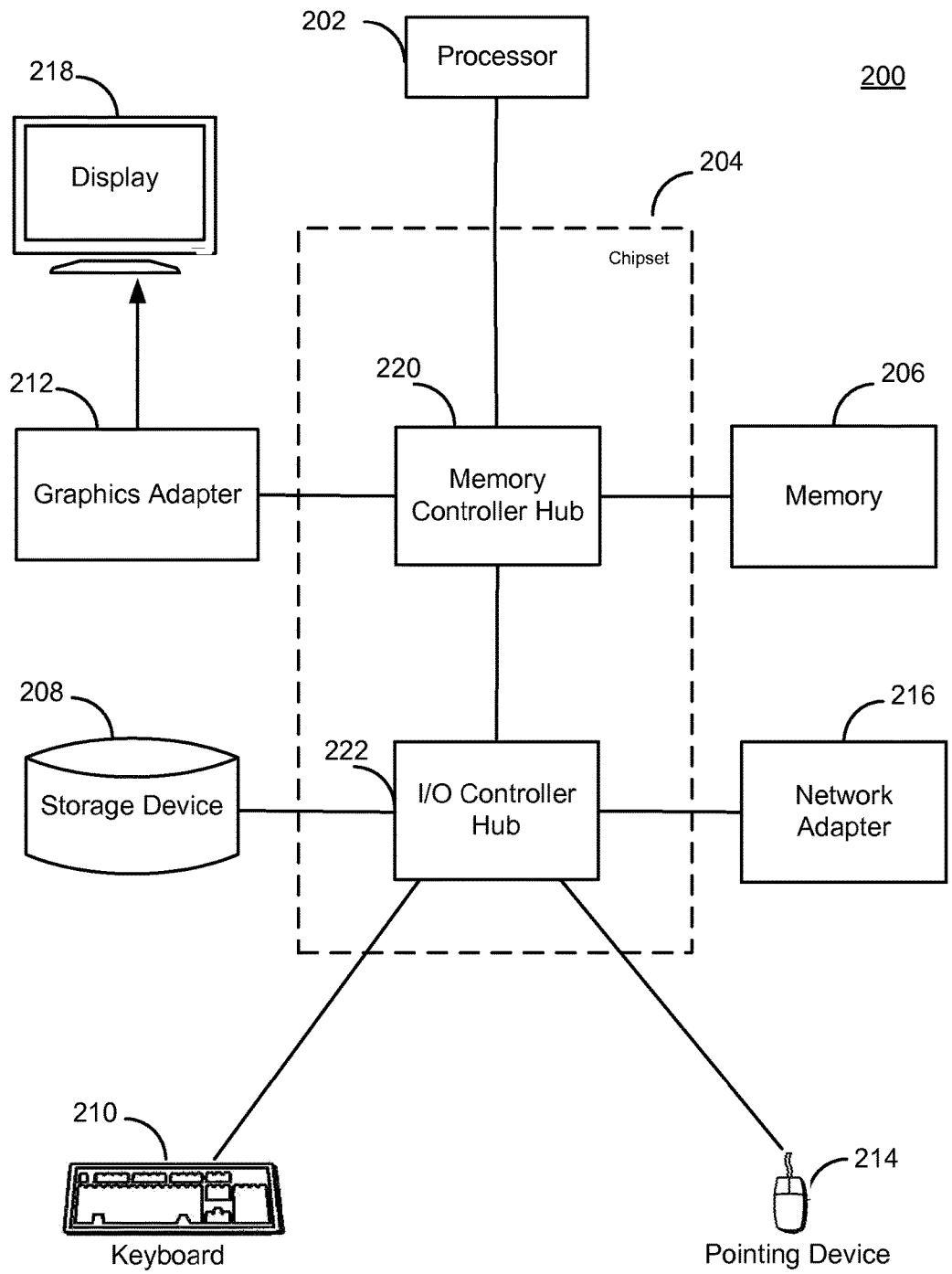
FIG. 2 is a high-level block diagram illustrating an example of a computer, according to one embodiment.

FIG. 2 is a high-level block diagram illustrating physical components of a computer 200 used as part of the client 102, master system 105 and/or worker system 106 from FIG. 1, according to one embodiment. Illustrated are at least one processor 202 coupled to a chipset 204. Also coupled to the chipset 204 are a volatile memory 206, a storage device 208 representing a non-volatile memory, a keyboard 210, a graphics adapter 212, a pointing device 214, and a network adapter 216. A display 218 is coupled to the graphics adapter 212. In one embodiment, the functionality of the chipset 204 is provided by a memory controller hub 220 and an I/O controller hub 222. In another embodiment, the memory 206 is coupled directly to the processor 202 instead of the chipset 204. In some embodiments, memory 206 includes high-speed random access memory, such as DRAM, SRAM, DDR RAM or other random access solid state memory devices.

The storage device 208 is any non-transitory computer-readable storage medium, such as a hard drive, compact disk read-only memory (CD-ROM), DVD, or a solid-state memory device. The memory 206 holds instructions and data used by the processor 202. The pointing device 214 may be a mouse, track ball, or other type of pointing device, and is used in combination with the keyboard 210 to input data into the computer 200. The graphics adapter 212 displays images and other information on the display 218. The network adapter 216 couples the computer 200 to the network 140.

As is known in the art, a computer 200 can have different and/or other components than those shown in FIG. 2. In addition, the computer 200 can lack certain illustrated components. In one embodiment, a computer 200 acting as a server may lack a keyboard 210, pointing device 214, graphics adapter 212, and/or display 218. Moreover, the storage device 208 can be local and/or remote from the computer 200 (such as embodied within a storage area network (SAN)), and, in one embodiment, the storage device 208 is not a CD-ROM device or a DVD device.

As is known in the art, the computer 200 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 208, loaded into the memory 206, and executed by the processor 202.

Embodiments of the entities described herein can include other and/or different modules than the ones described here. In addition, the functionality attributed to the modules can be performed by other or different modules in other embodiments. Moreover, this description occasionally omits the term "module" for purposes of clarity and convenience.

Figure 3:
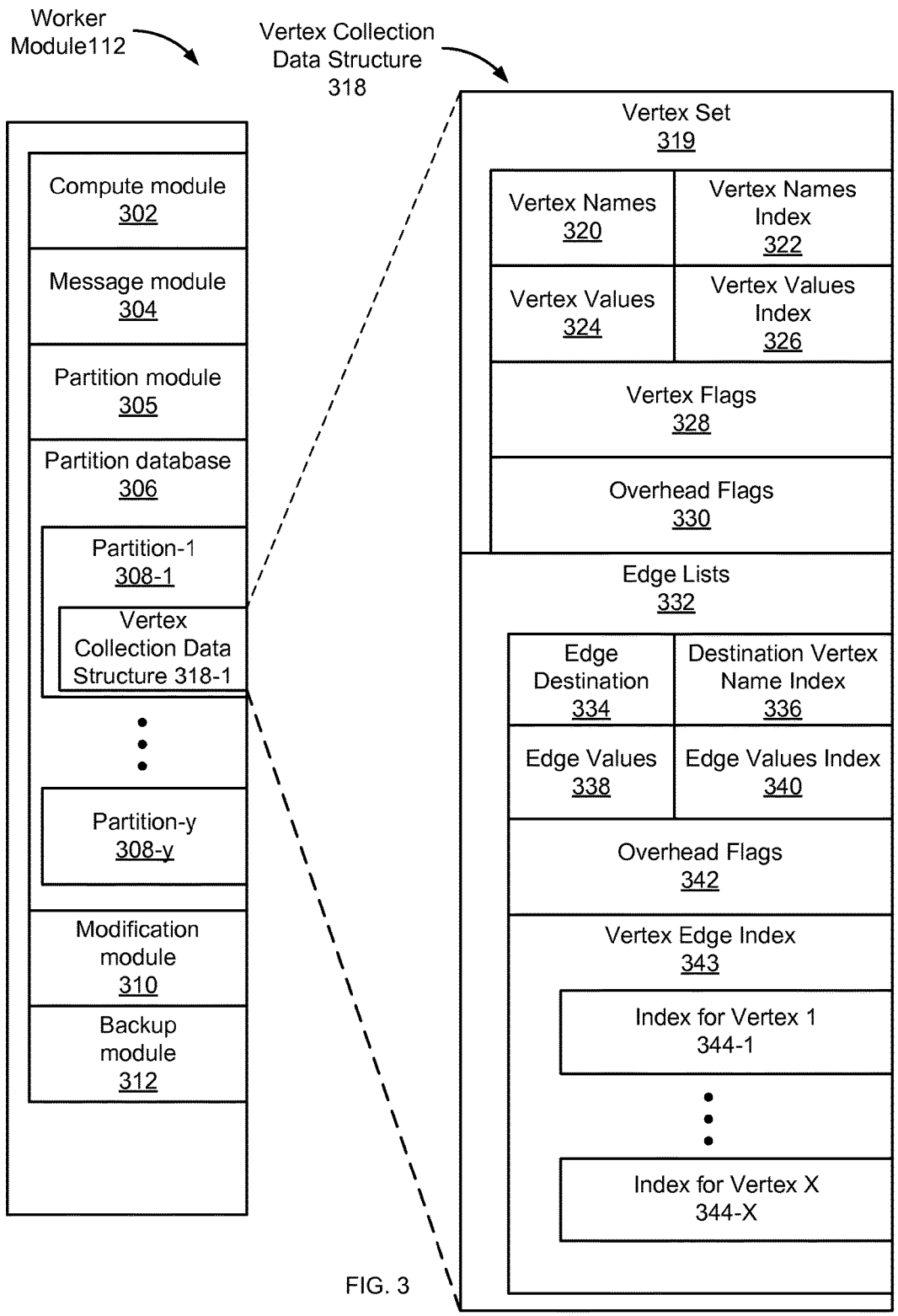
FIG. 3 is a high-level block diagram illustrating modules within a worker system, according to one embodiment.

FIG. 3 is a high-level block diagram illustrating modules within the worker module 112 of a worker system 106, according to one embodiment. The worker module 112 includes a compute module 302, a message module 304, a partition module 305, a partition database 306, a modification module 310 and a backup module 312. These modules store one or more partitions of a graph, execute a copy of the user program and modify the one or more partitions of the graph responsive to operations of the user program.

The worker module 112 includes a partition database 306 that stores one or more partitions 308 of a graph or stores the location of the one or more partitions 308 that are stored on the distributed storage system 103. A partition 308 stores information for a subset of the vertices and edges of a graph. A partition 308 is stored as a vertex collection data structure 318. The vertex collection structure 318 stores a vertex set 319 and edge lists 332 for a partition 308.

Figure 4A:
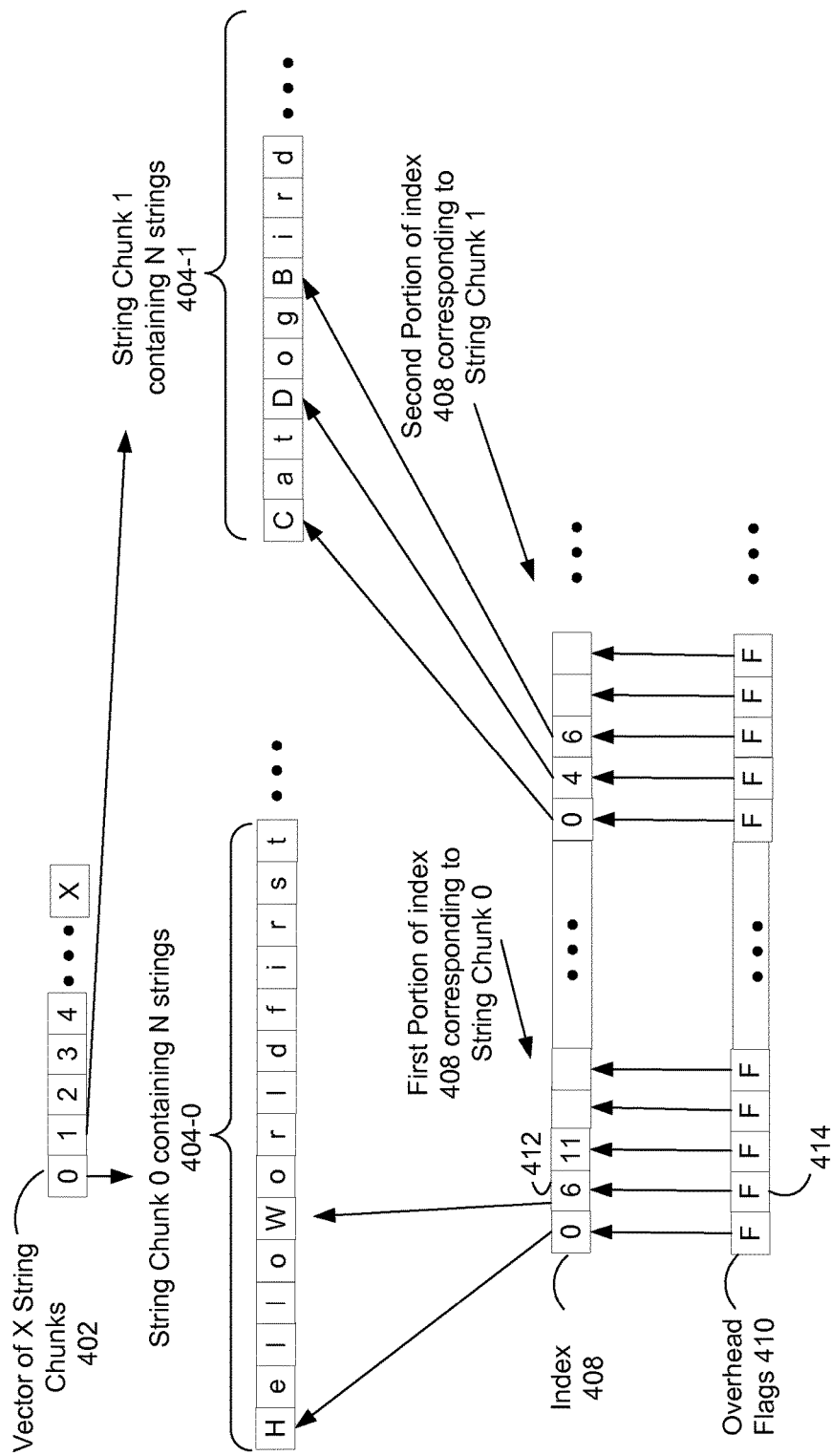
FIG. 4A illustrates aspects of a vertex collection data structure, according to one embodiment.

The vertex set 319 includes a vertex names vector 320 and a vertex values vector 324. A vector is a dynamic array which is a variable size data structure that allows elements to be added or removed. The vertex names vector 320 and the vertex values vector 324 store data fields for vertices. In particular, the vertex names vector 320 stores vertex names that identify respective vertices and the vertex values vector 324 stores user-defined data. The vertex names are strings while the vertex values may be any type of data. Both the vertex names and the vertex values may be user defined. The vertex names vector 320 includes multiple string chunks. For example, as shown in FIG. 4A, the vector 402 stores an integer number of string chunks including string chunk 0 404-0 and string chunk 1 404-1. A string chunk is a string of concatenated substrings. The substrings correspond to vertex names. Strings and substrings are sequences of symbols or characters. For example, as shown in FIG. 4A, String Chunk 0 404-0 of vector 402 includes the string "HelloWorldfirst" which consists of substrings "Hello", "World" and "first." In this example, the substring "Hello" may be a vertex name and the substring "World" may be another vertex name. In some embodiments, the number of substrings in a string chunk is a power of two. For example, a string chunk may include 1024 strings. In some embodiments, a string chunk allocates at least four bytes for each string in the string chunk. In some embodiments, the string chunks of a vector include the same number of strings. For example, each string chunk of a vector may include 1024 substrings.

The vertex set 319 of the vertex collection data structure 318 further includes a vertex names index 322. In some embodiments, the vertex names index 322 is a vector storing index values that identify positions of vertex names and vertex values in the vertex names vector 320 and the vertex value vector 324. The index values identify locations of substrings in the string chunks of a respective vector. For example, in FIG. 4A, the index 408 includes values identifying locations of substrings in the string chunks 404 in vector 402. In some embodiments, a respective index includes values that identify starting positions of substrings in a string chunk of a respective vector. Stated in another way, an index includes values identifying the offsets of the starting positions of substrings in a string chunk. For example, in FIG. 4A, index 408 stores the offset values of substrings in String Chunk 0 404-0. Also in this example, value 412 indicates that the second substring of String Chunk 0 404-0 starts at the sixth character position. In some embodiments, a respective index includes a value for each string or substring stored in each string chunk of a vector. For example, if a vector includes X number of string chunks of N number of substrings, the number of values stored by the index is the product of X and N. Different portions of an index correspond to different string chunks. For example, in the context of FIG. 4A, the first N values of index 408 (or values in positions 1 to N) correspond to String Chunk 0 404-0 and the second N values of index 408 (or values in positions N+1 to 2×N) corresponding to String Chunk 1 404-1.

The vertex collection data structure 318 further includes a set of exception flags 330. The set of exception flags 330 includes an exception flag for each substring identified by the values of a respective index. For example, if an index includes values for N substrings then there are N exception flags. In some embodiments, the set of exception flags 330 is a Boolean vector where each position of the vector is set to true or false. There may be an exception flag vector per string chunk in the vector of names. Each position of an exception flag vector corresponds to a position in an index and a flag at a position of the exception flag vector corresponds to the substring identified by the value in the position of the index. For example, as shown in FIG. 4A, the first position of the exception flag vector 410 corresponds to the first position of the index 408, the second position of the exception flag vector 410 corresponds to the second position of the index 408 and so on.

In some embodiments, an exception flag indicates whether a substring of a string chunk stores exception information. The exception information indicates whether a substring has been removed, whether a substring has been placed in an overflow string chunk and whether a substring has been replaced by a shorter substring. In FIG. 4A, the flag 414 is set to false which indicates that the substring ("World") identified by value 412 does not include exception information. Processes of a user program requesting access to a substring of a string chunk first check the corresponding exception flag in the exception flag vector in order to determine whether the process should examine the substring for exception information.

Figure 4B:
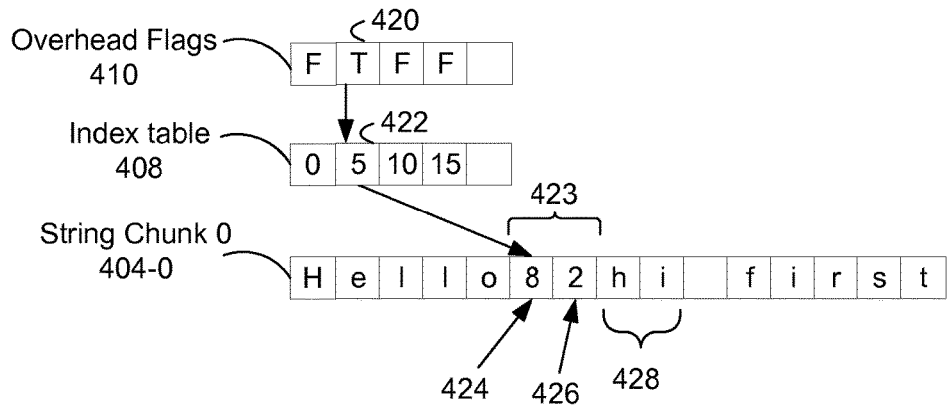
FIG. 4B illustrates aspects of a vertex collection data structure, according to one embodiment.

In some embodiments, the exception information in a portion of a string chunk includes information identifying a length of a substring stored in the portion of the string chunk. In this case, the location of the string chunk includes both exception information and a string. The exception information is placed in the first byte of the location and the new string is inserted into the location starting at the second byte. This may happen when a substring of a string chunk has been replaced with a new string that is shorter in length than the substring. For example, the string "World" may be replaced by the string "hi." In this example, the location previously occupied by the string "World" now stores both the string "hi" and exception information. For example, as shown in FIG. 4B, the exception information 423 includes a value 424 with a high bit set and a length 426 of the string "hi" 428. By including the length of the substring in the exception information, processes that request access to the substring do not have to calculate the length of the substring.

Figure 4C:
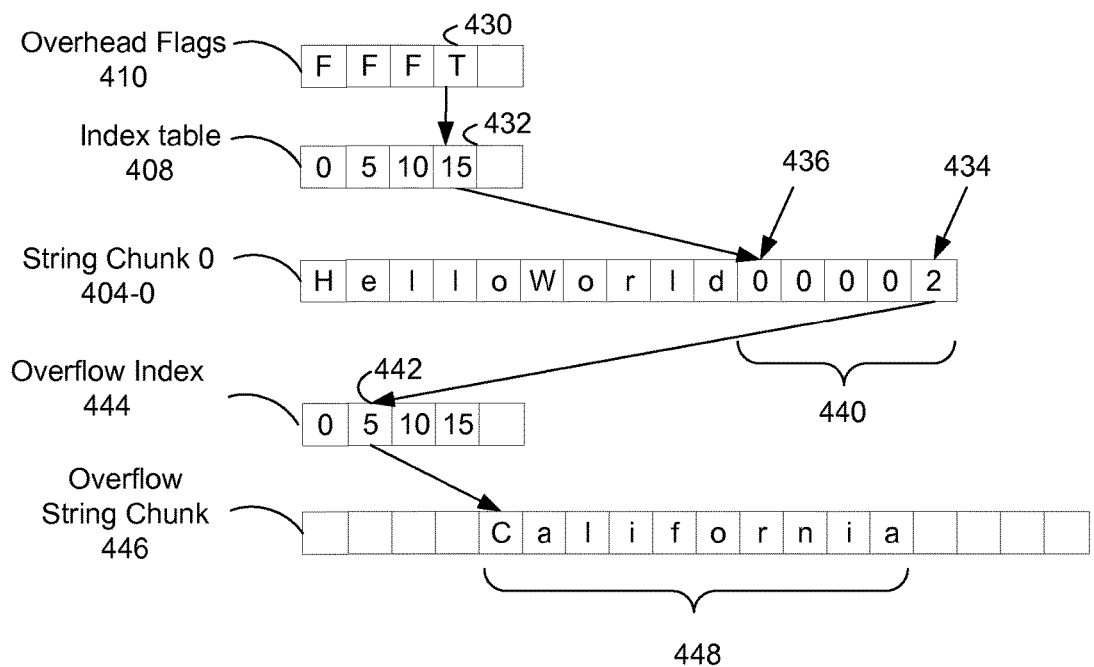
FIG. 4C illustrates aspects of a vertex collection data structure, according to one embodiment.

In some embodiments, the exception information includes information identifying a position in an overflow index. The position in the overflow index includes a value identifying a location of a substring in an overflow string chunk. In this case, an original substring has been replaced by a new string that does not fit in the location of the original substring. For example, as shown in FIG. 4C, the exception information 440 includes a value 434 that identifies a position in the overflow index 444 and the position in the overflow index 444 includes a value 442 that identifies the location of the string "California" 448. In some embodiments, the high bit or the most significant bit of the exception information is not set in order to indicate that a substring is not located at a corresponding portion of the string chunk.

In some embodiments, the vertex set 319 of the vertex collection data structure 318 includes one or more vectors of vertex flags 328. The vector of vertex flags includes a flag for each vertex name 320. A flag indicates whether a vertex is active or inactive. In some embodiments, a flag indicates whether a respective vertex has been modified.

The edge lists 332 of the vertex collection data structure 318 stores information about the edges for the vertices in the vertex collection data structure. The edge lists 332 include a vector of edge destinations 334 and a vector of edge values 338 that are similar in structure to the vector for vertex names 320 and the vector of vertex values 324 of the vertex set 319 described above. The vector of edge destinations 334 stores user defined edge values that may be of any data type. The edge lists 332 also include a destination vertex names index 336 that identifies edges associated with a vertex. The edge list 332 include exception flags 342 that are similar in structure to the exception flags 330 of the vertex set 319 described above.

The vertex collection data structure 318 described above provides a compact data structure for storing graph data. The overall result is that the amount of extra information necessary to store the graph data is minimal. By using a minimal amount of space to store graph data, the likelihood is increased that the graph can fit into faster memory such as high-speed random access memory as opposed to slower persistent storage.

The worker module 112 includes a partition module 305 that manages the data in (or data present at the location stored in) the partition database 306. The partition module 305 receives graph data (or location of the graph data) describing a partition of a graph and stores the graph data as a vertex collection data structure 318 in the partition database 306 (or at the location of the graph data indicated in the partition database 306). The partition module 305 examines the graph data and inserts the vertex names into the vertex names vector 320, the vertex values into the vertex values vector 324, the edge destinations into the edge destination vector 334 and the edge values into the edge value vector 338. The partition module 305 also sets the index values in the indexes (i.e., the vertex names index 322 and the destination vertex name index 336) of the vertex set 319 and the edge lists 332. The partition module 305 also sets the flags in the Boolean vector of vertex flags 328 and in the Boolean vector exception flags (330 and 342). The partition module 305 also saves the state of the partitions 308 in the partition database 306 in response to messages from the master system 105.

The worker module 112 includes a modification module 310 that modifies components of a partition of a graph responsive to operations of a user program. More specifically, the modification module 310 modifies the vertex collection data structure 318 storing the vertices and edges of a partition 308. The modifications include adding, modifying or removing a vertex or an edge. Modifying a vertex may include modifying the value of the vertex. Modifying an edge may include modifying the value of the edge. Some algorithms need to the change the topology of the graph. A clustering algorithm, for example, might replace each cluster of vertices with a single vertex, and a minimum spanning tree algorithm might remove certain edges.

During execution of a superstep, vertices may send requests to other vertices to add, remove or modify vertices and edges. In some embodiments, the request to modify a vertex or an edge includes a new string value and information identifying an existing string or substring corresponding to the vertex or the edge. The information, for example, may identify a position in an index for a vector. The modification module 310 identifies the location of the existing string corresponding to the edge or vertex based on information in the request. As discussed above, the position of an index stores a value identifying the location of a substring in a string chunk.

When the modification module 310 receives a request to remove an edge or a vertex, the modification module 310 identifies the location of the substring corresponding to the edge or vertex, replaces the substring with a value that has an upper bit set to false and sets the corresponding exception flag to true. For example, the modification module 310 may replace the substring with all zeros. As discussed above, when the exception flag for a substring location has been set, the upper bit of the value in the location indicates whether a string is present at the location.

When the modification module 310 receives a request to replace an edge or a vertex, the modification module 310 identifies the existing substring corresponding to the edge or vertex and compares the length of the existing substring with the length of the new string contained in the request. Based on the comparison, the new string may be equal in length to the existing substring, shorter in length than the existing substring or longer than the existing substring. When the length of the new string is equal to the length of the existing substring, the modification module 310 replaces the existing substring with the new string.

When the new string is shorter in length than the existing substring, the modification module 310 replaces the existing substring with the new string and exception information. The exception information includes the length of the new string and an indication that a string is present. In one example, the high bit of the exception information is set and the low bytes of the exception information specify the length of the new string. The modification module 310 also sets the exception flag corresponding to the new string. For example, as shown in FIG. 4B, the flag 420, which corresponds to new string 428, is set in the vector of exception flags 410.

When the new string is longer in length than the existing substring, the modification module 310 inserts the new string into an overflow string chunk, replaces the existing substring with exception information and sets the exception flag for the new string. The exception information includes information identifying the location of the new string. The location may be a position in an index for the overflow string chunk. In some embodiments, the upper bit of the exception information indicates whether a string is present in a portion of the string chunk and the lower bytes of the exception information indicate the location of the new string. For example, as shown in FIG. 4C, the exception information 440 includes an upper bit 436 set to false and location information 434 for the new string. In the context of FIG. 4C, the location information 434 identifies a position in the overflow index 444. The position in the overflow index 444 includes a value 442 that identifies the location of the new string "California" 448 in the overflow string chunk 446. The overflow string chunk 446 may be stored in a vector of overflow string chunks.

By inserting longer strings into overflow string chunks, processing time is saved by not having to rearrange elements in a string chunk. In some embodiments, the partition module 305 periodically merges the overflow string chunks into a vector. For example, the partition module 305 may merge the overflow string chunks for vertex names into the vector for vertex names.

The worker module 112 includes a compute module 302 that executes a defined function in an algorithm for each superstep for each active vertex. During a superstep, for each active vertex, the compute module 302 passes to the defined function the current value of the vertex, a reference to the incoming messages and a reference to the outgoing edges of the vertex. The worker module 112 then executes the function and the output of the function maybe data representing results of the algorithm, changed state of the vertex, or outgoing messages for one or more destination vertices. The outgoing messages are received by the destination vertices and processed in the next superstep. The compute module 302 keeps performing the function for all the active vertices managed by the worker module 112 every superstep until there are no more active vertices. Once no additional active vertices are left, the algorithm concludes and the worker module 112 sends the result of the algorithm to the master system 105 for output.

The worker module 112 includes a message module 304 that sends messages from one vertex to another vertex during a superstep. A vertex may send messages to another vertex on a different worker system 106. The vertices may send messages to other vertices in order to obtain information about other vertices, to add or remove vertices or edges and to modify vertices and edges. In one embodiment, the message module 304 stores and manages message queues for vertices in the partitions 308 stored in the partition database 306. For each vertex, the message module 304 maintains an incoming message queue for the current superstep and an incoming message queue for the next superstep. The messages include a message value and the name of the destination vertex. The value of a message depends on the function or algorithm that generated the message. For example, in a shortest path algorithm, the message may contain information about distances of vertices.

In some embodiments, the message module 304 stores and manages an outgoing message queue for a vertex. The messages in the outgoing message queue may be transmitted once the queue reaches a threshold size. The message module 304 is also responsible for sending and responding to messages from the master system 105. As discussed above, the master system 105 periodically sends messages to the worker systems 106 to check on the status of a computation.

The worker module 112 also includes a backup module 312 that stores data for each vertex managed by the worker module 112 in the backup database 116. Because the backup database 116 is in non-volatile storage, the backup module 312 can retrieve data from the backup database 116 to re-initialize a worker module 112 in case the worker module 112 fails and loses the data stored in volatile memory.

Figure 6:
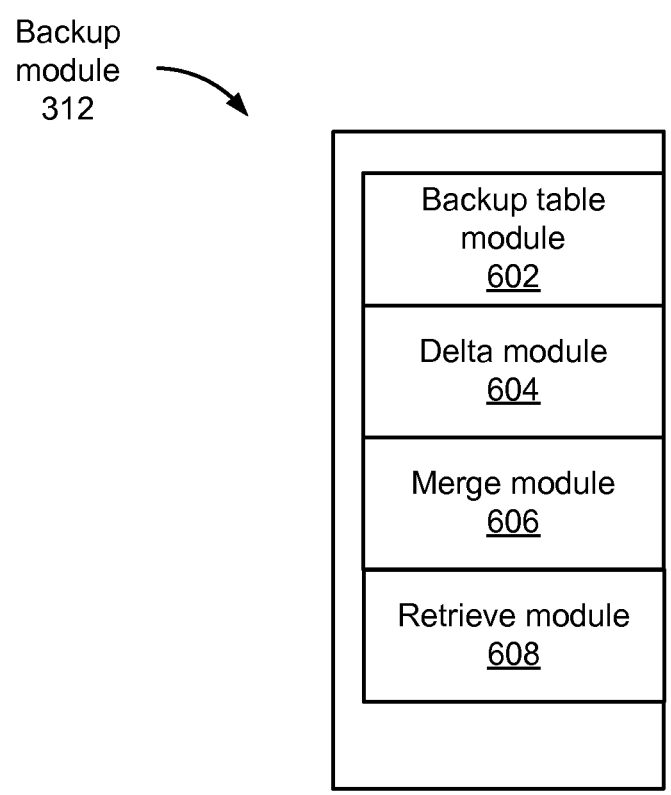
FIG. 6 is a high-level block diagram of a backup module within a worker system, according to one embodiment.
Figure 7A:
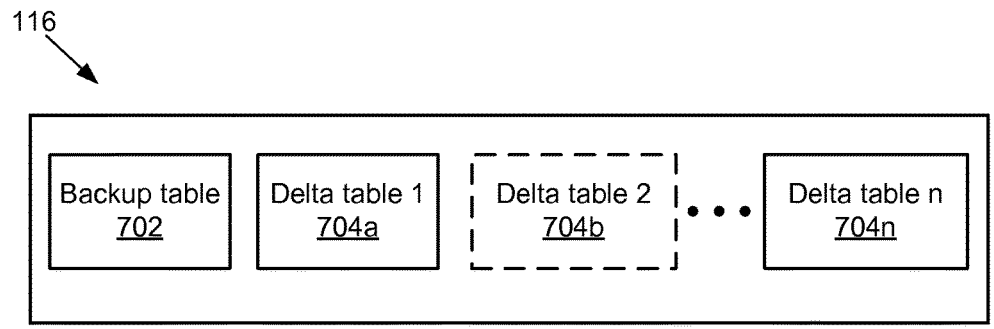
FIG. 7A is a high-level block diagram of a backup database created by the backup module within a worker system, according to one embodiment.

FIG. 6 is a high-level block diagram of a backup module 312 within a worker system 106, according to one embodiment. The backup module 312 stores in the backup database 116 the initial graph data for one or more partitions managed by the worker system 106 that includes the backup module. Additionally, the backup module 312 stores in the backup database 116 the modified graph data for the one or more partitions. FIG. 7A is a high-level block diagram of a backup database 116 created by the backup module 312 within a worker system 106, according to one embodiment. As illustrated in FIG. 7A, the backup database 116 includes a backup table 702 and one or more delta tables 704a-n. The backup module 312 stores the initial graph data in the backup table 702 and the modified graph data in delta tables 704a-n. Again, after a backup threshold is reached, the backup module 312 stores additional backup data in a new table. Moreover, in one embodiment, the backup threshold is at the beginning or end of a superstep. Accordingly, in this embodiment, the backup module 312 stores the initial graph data in the backup table 702 and then stores additional data in each subsequent superstep in separate backup delta tables 704a-n. The backup table 702 and delta tables 704a-n may be a list, an array or another data structure capable of storing graph data for multiple vertices. The backup module 312 retrieves data about various vertices from the backup database 116 to re-initialize a worker system 106 after a failure.

Referring back to FIG. 6, the backup module 312 comprises a backup table module 602, a delta module 604, a merge module 606 and a retrieve module 608. The backup table module 602 receives from the master system 105 and stores the graph data for the vertices in the backup table 702. For each vertex, the backup table module 602 receives a unique identifier associated with the vertex. In one embodiment, the unique identifier is the vertex name. In another embodiment, the unique identifier is an alphanumeric or a numerical string associated with the vertex. Additionally, for each vertex, the backup table module 602 receives the state data for the vertex including a vertex value, an edge list including data for the vertex's outgoing edges (the data for each outgoing edge including a unique identifier for the edge's destination and the destination's value), a queue containing incoming messages, and a flag specifying whether the vertex is active. The backup table module 602 receives and stores the data in the backup table 702.

The backup table module 602 stores the vertices' unique identifiers and their state information in an immutable and an ordered backup table 702. The data in the immutable backup table 702 do not change, move or get deleted once the backup table module 602 writes the data to the backup table 702. The backup table module 602 may write additional data to the backup table 702, but the backup module 602 does not change, move or delete the data already written in the table 702.

Figure 7B:
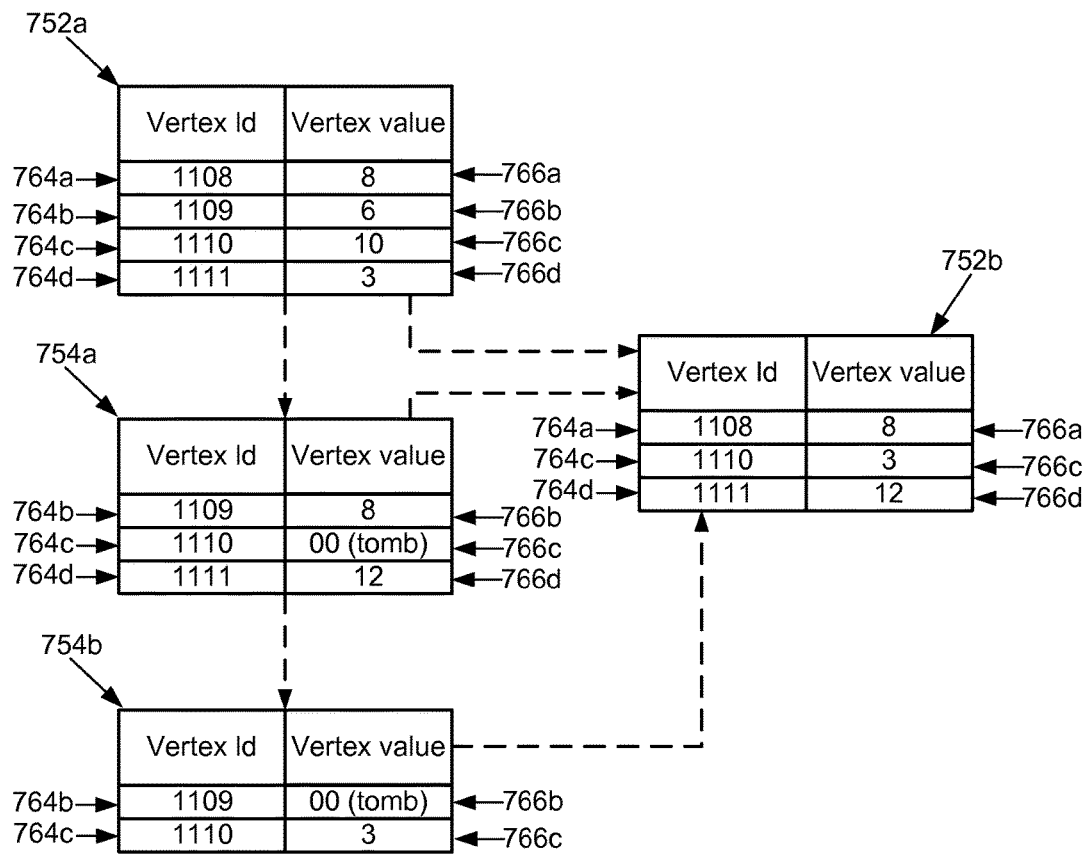
FIG. 7B is an example of tables maintained within the backup database, according to one embodiment.

Additionally, the backup table module 602 writes the data for the vertices in an order determined based on the vertices' unique identifiers. In one embodiment, a unique identifier includes a unique alpha-numerical or a unique numerical portion and the backup table module 602 writes the data for vertices in an ascending or descending order of the alpha-numerical or numerical portion. FIG. 7B includes an example of a backup table 752 within the backup database 116, according to one embodiment. The backup table 752 includes unique numerical identifiers 764a-d and vertex values 766a-d for four vertices. For illustration purposes, the remaining state information for the vertices have not been depicted in FIG. 7B, but one of ordinary skill in the art would understand that the backup table 752 may include additional or different state information for the vertices. As depicted in FIG. 7B, the backup table module 602 has written data for the four vertices in an ascending order of their numerical identifiers 764a-d. Amongst the four identifiers 764a-d, the identifier 764a has the smallest value of 1108 and therefore the data about the vertex identified by identifier 764a is written in the first row of the table 752. For similar reasons, data for the vertex identified by identifier 764d is written last.

Referring back to FIG. 6, the backup module 312 also includes a delta module 604 that creates delta tables 704a-n for storing modifications made to data associated with a vertex represented in the backup table 702. The delta module 604 creates and stores a delta table 704 in the backup database 116 after a backup threshold is reached. As mentioned previously, the backup threshold may be configured to be reached at the beginning or end of a superstep, or based on an amount of state data accumulated in the current delta table. Like the backup table 702, the delta tables 704a-n are ordered and immutable, and in one embodiment, the delta module 604 writes to the same delta table 704 until the order for the delta table 704 cannot be maintained.

In one embodiment, the active vertices are processed in a manner that maintains the order in the backup table 702 or delta table 704 for at least a superstep. At each superstep, the compute module 302 executes the defined function for each of the active vertices in an order based on the active vertices' unique identifiers. Because tables 702-704 store the vertices' information in an order based on the vertices' identifiers, active vertices with data stored at a higher order (i.e. an earlier position) in a delta table 704 or a backup table 702 are processed earlier than active vertices with data stored at a lower order (i.e. at a later position).

Such ordered processing results in efficient reading of data from tables 702-704. For executing the defined function for an active vertex, the compute module 302 may need to retrieve data from tables 702-704 and determine the vertex's state. Because the vertices are processed in the same order as the order of their data's storage in tables 702-704, the compute module 302 may retrieve a buffer of data from the tables 702-704 that includes data about the currently processed vertex and one or more subsequent vertices. The subsequent vertices are likely to be processed shortly after the currently processed vertex because their processing is based on the same order as the order of their data's storage. Accordingly, the worker module 112 may not perform a separate read for processing each subsequent vertex and beneficially reduce the number of reads on tables 702-704 for processing a group of vertices.

In some embodiments, the backup database 116 storing tables 702-704 for a worker system 106 is stored in a persistent storage external to or remote from the worker system 106. In these embodiments, retrieving data for subsequent vertices with data for the currently processed vertex also reduces transmission overhead associated with transmitting numerous read requests for separate vertices and receiving data in separate replies to the separate requests.

In addition to efficient reading, the ordered processing of vertices also provides an efficient manner of writing data to tables 702-704. Because the vertices in a superstep are processed in an order based on their identification, the modified state data that results from processing of a higher ordered vertex is written earlier to a delta table 704 or a backup table 702 than the modified state data for a lower ordered vertex. Such ordered processing beneficially prevents unnecessary creation of new delta tables that may have resulted from processing of a lower ordered vertex before a higher ordered vertex.

Referring to FIG. 7B, the delta table 754a is an example of an ordered delta table created by the delta module 604 after the modification module 310 modifies vertex values 764b-d indicated in the backup table 752a. The delta table 754a includes unique identifiers 764b-d and the modified vertex values 764b-d for the three associated vertices. Like the backup table 752a, the delta table 756a includes data for the vertices in an ascending order based on their numerical identifiers 764b-d. Additionally, like the backup table 752a, the delta table 754a is immutable and data once written into the delta table 754a cannot be moved, modified, or deleted.

Accordingly, the delta module 604 may write the unique identifier 764b and corresponding value 766b followed by the unique identifiers 764c-d and the vertex values 766c-d. However, if the vertex value 766b is modified again, the delta module 604 cannot replace the previously written vertex value 766b with the modified value 766b in the delta table 754a because the delta table 754a is immutable. Additionally, because the delta table 754a is also ordered, the delta module 604 cannot create another entry in the delta table with the modified value 766b and the corresponding unique identifier 764b. Inserting another copy of the unique identifier 764b at the end of the delta table 754a would violate the order of the unique values stored in ascending order. Additionally, inserting another copy of the unique identifier 764b in-between the previous copy of the unique identifier 764b and the unique identifier 764c would lead to shifting of the unique identifiers 764c-d and their corresponding values 766c-d. Such an insertion would therefore impermissibly change the data already written to the delta table 754a.

Accordingly, the delta module 604 creates an additional delta table 754b for any later modifications to an already written value. In one embodiment, the delta module 604 creates a delta table 754 each superstep and writes the modified values for a vertex after all the computations have been completed for that vertex. Accordingly, the modified values once written in the created delta table for that superstep are not modified again in the same superstep, and the delta module 604 need not create another delta table 754 in the same superstep.

The backup module 312 includes a merge module 606 that merges the delta tables 704a-n with the backup table 702 after a merge threshold is reached. The merge threshold is based on the number of delta tables 704a-n created since the last merge or creation of the initial backup table 702, the size of one or more delta tables 704a-n created since the last merge, or the number of supersteps completed since the last merge.

After the merge threshold is reached, the merge module 606 merges the backup table 702 and the delta tables 704a-n into a new backup table (not shown). Like the initial backup table 702 and the delta tables 704a-n, the new backup table is also ordered and immutable. To create this backup table, the merge module 606 starts at the beginning of the backup table 702 and selects the first vertex stored in the backup table 702. Because the backup table 702 is ordered, the first vertex is the vertex in the backup table 702 with the smallest numerical or alpha-numerical value in its unique identifier. The merge module 606 then searches for the selected identifier in delta tables 704a-n. If found in one or more delta tables 704a-n, the merge module 606 selects the identifier and its corresponding values from the latest created delta table 704.

Because the backup table 702 and the delta tables 704a-n are ordered, the merge module 606 stops searching a delta table 704 for the selected identifier once it reaches a unique identifier with a value greater than the value of the selected identifier. Additionally, if the unique identifier is found in a delta table 704, the merge module 606 maintains the location of the found identifier in the delta table 704. After selecting the unique identifier and its corresponding values from the latest delta table 704, the merge module 606 populates the new backup table with the selected identifier and corresponding values. The merge module 606 then repeats the process for the next unique identifier in the backup table 702. However, instead of searching a delta table 704 from its beginning, the merge module 606 begins its search for the next identifier from the maintained location if one exists for the delta table 704. Because the backup table 702 and the delta tables 704a-n are ordered, a delta table 704 with a maintained location would not have the next unique identifier before the maintained location. Accordingly, the merge module 606 beneficially uses the tables 702-704n and the maintained locations to perform an efficient search of unique identifiers with the latest modified values.

The merge module 606 stores the resulting unique identifiers and their corresponding values in the new backup table. FIG. 7B illustrates an example of a new backup table 752b created by merging the previous backup table 752a and its associated delta tables 754a-b. The new backup table 752b includes the unique identifiers 764a,c,d and their corresponding values 766a,c,d. The new backup table 752b does not include the unique identifier 764b and its corresponding value 766b because the value 766b was marked deleted in delta table 754b as indicated by a "tombstone" value 00. One of ordinary skill in the art will understand that the deleted value may be represented by another value in the delta tables 754a-b.

Additionally, the new backup table 752b includes the unique identifier 764c and corresponding value 766c although it was marked deleted in delta table 754a because a new value 766c was added for the same identifier 764c in the next delta table 754b. Because the merge module 606 selects the identifier from the latest delta table 754b, the merge module 606 selects the new value 766c in delta table 754b instead of the value indicating a deleted value in delta table 754a. Accordingly, a deletion in one delta table followed by insertion of the same value in a subsequent delta table results in presence of the inserted value and its corresponding identifier in the merged backup table. In one embodiment, the merge module 606 deletes the previous backup table 702 and the delta tables 704*a-n* after a new backup table is complete.

Figure 9:
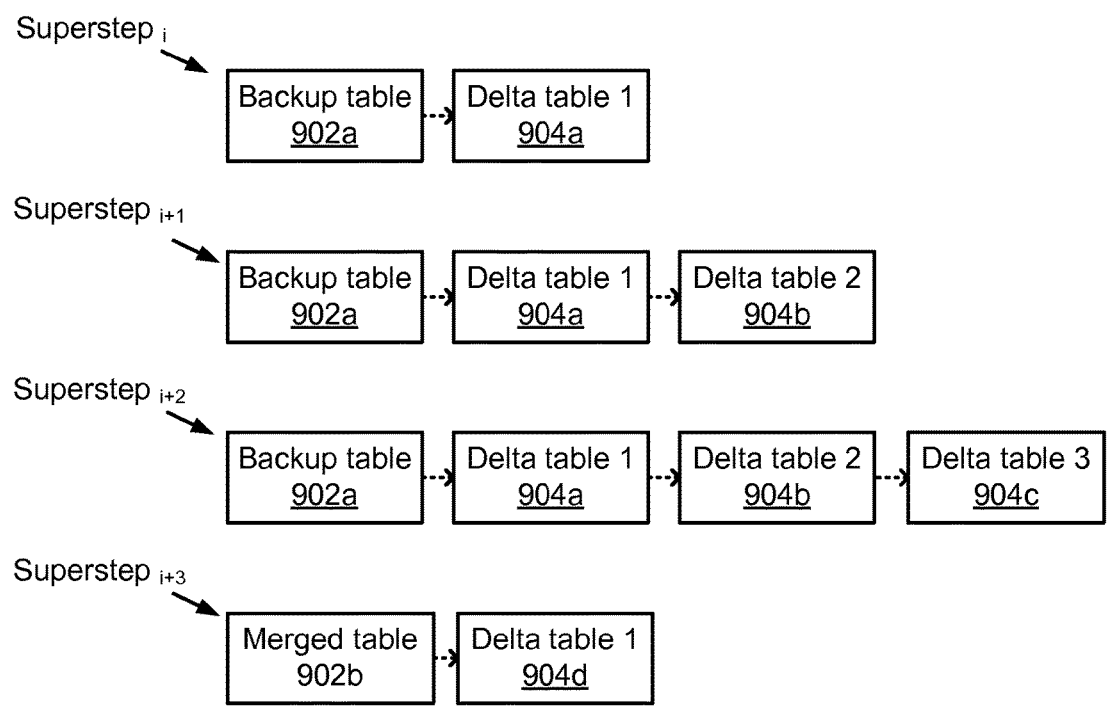
FIG. 9 illustrates an example of new backup tables created after a backup threshold is reached and a merged table created after a merge threshold is reached, according to one embodiment.

Again, in one embodiment, the backup threshold is at the beginning or end of a superstep and a new backup table 702 or delta table 704 is created at each superstep. In this embodiment, the merge module 606 merges the backup tables 702 and delta tables after a merge threshold (that may span several supersteps) is reached. FIG. 9 illustrates an example of new backup tables created after a backup threshold is reached and a merged table created after a merge threshold is reached. In this example, the backup threshold is a superstep and a new delta table 904 is created every superstep for storing state information modified during the superstep. The merge threshold is creation of three delta tables 904*a-c* since a previous merge or creation of a backup table. As indicated above, in other embodiments, the backup threshold and merge threshold may be different.

Referring to FIG. 9, the state data stored in backup table 902*a* is modified in superstep; and the delta module 604 determines that the backup threshold is reached. The backup module 604 therefore creates a delta table 1 904*a* for the modified state data. Similarly, the delta module 604 creates delta table 2 904*b* at superstep$_{i+1}$ and delta table 3 904*c* at superstep$_{i+2}$. Because a delta table 904 is created for modification to state information at every superstep, a worker system 106 may beneficially determine the state of the vertices at a superstep by referring to the backup table 902 and delta tables 904 created until that superstep. For example, if a failure occurred at superstep$_{i+2}$ and the worker system 106 needed to recover the state information for its vertices at superstep$_{i+1}$, the worker system 106 may infer that backup table 902*a* stores the state of its vertices and delta table 1 904*a* and delta table 2 904*b* store any changes to the state information made until superstep$_{i+1}$.

At superstep$_{i+3}$, the merge module 606 determines that the merge threshold has been reached and merges backup table 902*a* and delta tables 904*a-c* into a merged backup table 902*b*. At the same superstep$_{i+3}$, the delta module 604 determines that the backup threshold has been reached and creates a new delta table 1 904*d* that stores modifications made to the merged backup table 902*b*. In one embodiment, the merge module 606 merges the backup table 902*a* and delta tables 904*a-c* after modifications to state data in superstep$_{i+3}$. In this embodiment, the delta module 604 does not create a delta table in superstep$_{i+3}$ because the state information in the merged table 902 is not modified again in superstep$_{i+3}$ after the merge. In subsequent supersteps, additional delta tables 904 are created and merged with the backup table 902 as described above.

The backup module 312 also includes a retrieve module 608 for retrieving data stored in the backup database 116. In one embodiment, the retrieve module 608 retrieves data from the backup database 116 to restore a worker system 106 after a failure. In another embodiment, the retrieve module 608 retrieves data from the backup database 116 to load additional data into volatile memory for further processing. Regardless of the purpose of retrieving data, the retrieve module 608 retrieves data from the backup table 702 and delta tables 704*a-n* in the same manner as the merge module 606. The retrieve module 608 traverses down the backup table 702 and delta tables 704*a-n* simultaneously and retrieves the unique identifier and its associated values from the latest created delta table 704 that includes the desired data. If the delta tables 704*a-n* do not include a unique identifier and its associated values, the retrieve module 608 retrieves the data for the unique identifier from the backup table 702.

Figure 5:
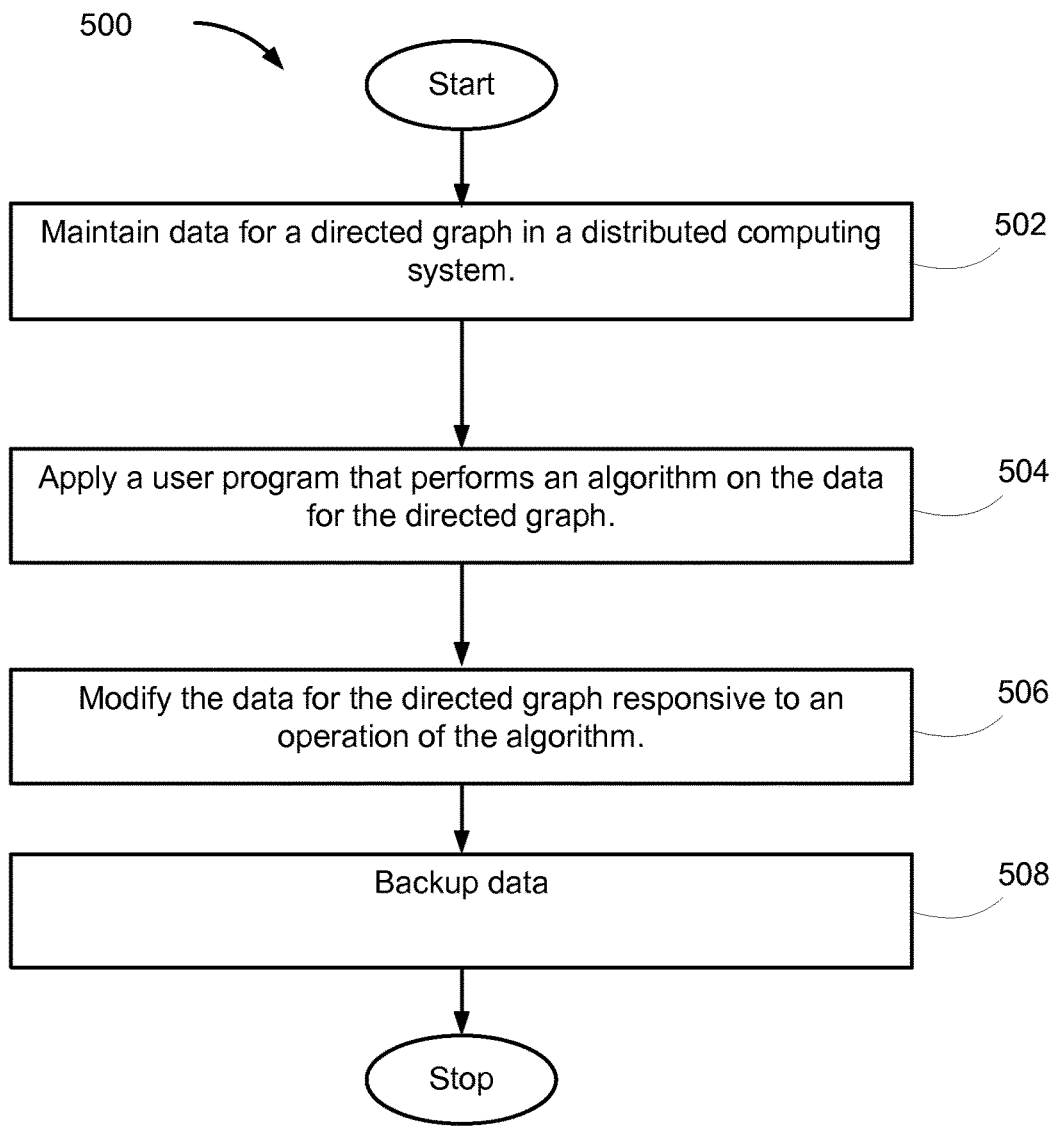
FIG. 5 is a flow diagram that illustrates a process for maintaining and modifying graph data, according to one embodiment.

FIG. 5 is a flow diagram that illustrates a process for maintaining and modifying graph data, in accordance with one embodiment. This process 500 is performed by a server system (e.g., worker system 106) having one or more processors and non-transitory memory. The non-transitory memory stores one or more programs to be executed by the one or more processors. The one or more programs include instructions for process 500.

A worker system 106 maintains 502 data for a graph in a distributed computing system. The data describe a graph modeling a real-world condition having an associated problem. The graph describes a set of relationships among a set of items. In some embodiments, the graph represents relationships among a set of tangible real-world items. The graph has graph components with associated data fields. The graph components include vertices and edges connecting the vertices. The data fields describe vertex names, vertex values, edge destination names or edge values. In some embodiments, the data describe a partition of a graph. A partition of a graph includes a subset of the vertices and edges of the graph. The data include a plurality of vectors where a respective vector includes a plurality of string chunks. A string chunk includes a plurality of substrings that corresponds to the data fields. The data further include an index for each respective vector where a respective index includes values that identify locations of substrings in the string chunks of a respective vector. The data further include a set of exception flags for each respective index where the set of exception flags comprise an exception flag for each substring identified by the values of the respective index. The data for the graph are maintained as a vertex collection data structure described above. As described above, the partition module 305 on each worker system 106 maintains one or more partitions in the partition database 308.

The worker system 106 applies 504 a user program that performs a function on the data for the graph every superstep until the graph includes active vertices. The user program performs a function on the data describing the graph to analyze the relationships among the items in order to identify a solution to a problem. The user program is executed by a compute module 302 of the worker system 106 and the user program is executed on the one or more partitions stored in the worker system 106. The analysis includes identifying a request change to a data field associated with a graph component responsive to an operation performed during the analysis. The request includes a new value for the data field. The request may be to modify or replace a vertex name, a vertex value, an edge value or an edge destination. In some embodiments, the request includes information identifying the location of the data field. For example, the information may include a reference to a position in an index. The modification module 310 identifies an existing value for the data field based on the information in the request. In some embodiments, the existing value and the new value are strings.

The analysis further includes comparing the new value with an existing value of the data field associated with the graph component. In some embodiments, the comparison includes comparing the length of the new value and the length of the existing value. The comparison reveals whether the new string and the existing string are of a same length, whether the new string is shorter than the existing string and whether the new string is longer than the existing string. The modification module 310 compares the existing value and the new value to produce a comparison result.

In each superstep, the modification module 310 in the worker system 106 modifies 506 one or more data fields of the graph based on the analysis in step 504. In some embodiments, the modifying includes replacing the existing value with the new value when the comparison result reveals that the existing value and the new value are a same length.

In some embodiments, responsive to the analysis indicating that the length of the new value is equal to or less than the length of the existing value, the modifying includes replacing the existing value in the data field with the new value. In some embodiments, responsive to the analysis indicating that the length of the new value is less than the length of the existing value, the modifying further includes adding exception information to the data field. The exception information indicates the length of the new value. The modifying further includes setting an exception flag associated with the data field. The exception flag indicates that the exception information is present in the data field. For example, a lower bit of the exception information may include the length of the new value. By including the length of the new value in the exception information, the length of the new value does not have to be calculated thereby saving processing resources.

In some embodiments, responsive to the analysis indicating that the length of the new value is greater than the length of the existing value, the modifying includes inserting the new value into an overflow string chunk of data describing the graph. The modifying also includes replacing the existing value in the data field with exception information. The exception information identifies a location of the new value in the overflow string chunk. The modifying also includes setting an exception flag associated with the data field where the exception flag indicates that the exception information is present in the data field. In some embodiments, the overflow string chunk is stored in a vector of string chunks. In some embodiments, the exception information identifies a position in an index and the position in the index stores a value identifying the location in the overflow string chunk containing the new value. By storing strings that do not fit in the original string chunk into overflow string chunks, memory and processing resources are saved by not having to re-arrange elements in the original string chunk.

After the modifications to the graph data in step 506, the backup module 312 in the worker system 106 stores 508 the backup data. In one embodiment, the backup module 312 stores 508 the backup data at every superstep. In another embodiment, the backup module 312 stores 508 the backup data based on another criterion. Accordingly, the worker system 106 may not perform step 508 every superstep or may perform step 508 multiple times during a superstep. The step 508 is described further below in description of FIG. 8. The worker system 106 repeats steps 504-506 (and alternatively step 508) for active vertices every superstep until no active vertices are left.

Figure 8:
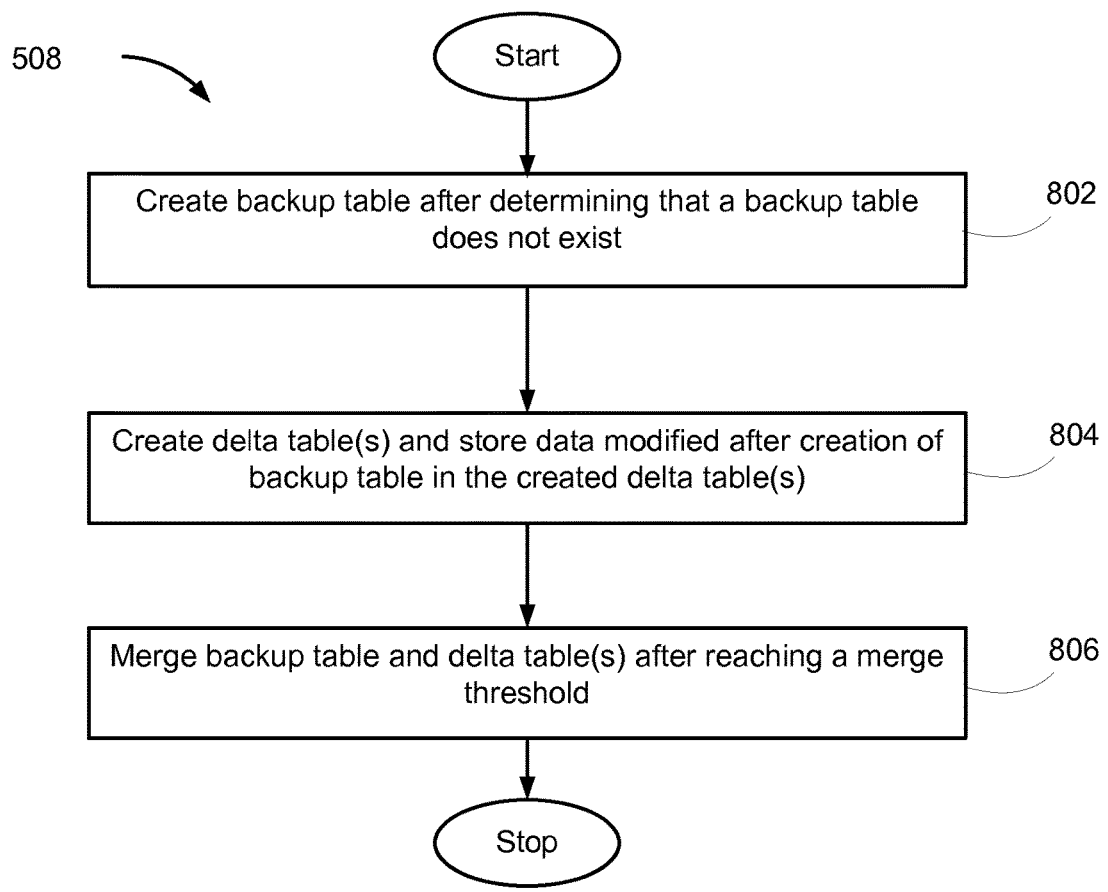
FIG. 8 is a flow diagram that illustrates a process for maintaining and updating a backup of graph data, according to one embodiment.

FIG. 8 is a flow diagram that illustrates a process for maintaining and updating a backup of graph data, according to one embodiment. To store backup data for one or more partitions assigned to a worker system 106, the backup module 312 in the worker system 106 creates 802 a backup table after determining that a backup table does not exist. The backup module 312 then creates 804 one or more delta tables and stores the data modified after creation of backup table in the created one or more delta tables. The backup module 312 next merges 806 the backup table and the one or more delta tables after reaching a merge threshold.

Some portions of the above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs for a system and a process for processing digital documents and reformatting them for display on client devices. Thus, while particular embodiments and applications have been illustrated and described, it is to be understood that the present invention is not limited to the precise construction and components disclosed herein and that various modifications, changes and variations which will be apparent to those skilled in the art may be made in the arrangement, operation and details of the method and apparatus disclosed herein without departing from the spirit and scope as defined in the appended claims.

What is claimed is:

1. A computer-implemented method executed by one or more processors for analyzing graph data representing relationships among items, the graph data including a plurality of vertices connected by one or more edges representing the relationships among items in the graph, each of the vertices associated with one or more data fields, the method comprising:

identifying requests by a worker system in a distributed computing system including a plurality of workers systems to which the graph data is partitioned, each request to change a data field associated with a particular vertex in the graph data responsive to an operation performed during an analysis of the graph data, the request including a new value for the data field, and for each request:

comparing, by the worker system, the new value with an existing value of the data field associated with the particular vertex in the graph data;

modifying, by the worker system, the data field in the graph data based on the comparison, wherein modifying the graph data does not include modifying backup data for the graph data stored in a backup table; and responsive to modification of the data field in the graph data, storing, by the worker system in a memory of the worker system, a representation of the modified data field in a respective delta table for the request, the respective delta table different than the backup table;

determining, by the worker system, after each request, whether a number of respective delta tables has reached a merge threshold;

in response to determining that the number of respective delta tables has reached the merge threshold:

merging, by the worker system, the backup table and the delta tables to create a new backup table; and replacing, by the worker system, the backup table with the new backup table.

2. The method of claim 1, further comprising:

responsive to an additional modification of the data field in the graph data after storing the representation of the modified data field in the delta table, storing an additional representation of the modified data field in an additional delta table.

3. The method of claim 1, wherein comparing the new value and modifying the data field are repeated for a plurality of iterations, and the method further comprising:

storing a representation of the modified data field from each iteration in a different delta table.

4. The method of claim 3, wherein storing the representation of the modified data field from each iteration in a different delta table is performed in response to the data field already existing in the delta table.

5. The method of claim 3, further comprising:

merging the backup table and the delta tables created in the plurality of iterations after a threshold number of iterations have been completed.

6. The method of claim 1, wherein the backup data for the graph data is a copy of the graph data.

7. A non-transitory, computer-readable medium storing instructions operable when executed to cause at least one processor to perform operations for analyzing graph data representing relationships among items, the graph data including a plurality of vertices connected by one or more edges representing the relationships among items in the graph, each of the vertices associated with one or more data fields, the operations comprising:

identifying requests by a worker system in a distributed computing system including a plurality of workers systems to which the graph data is partitioned, each request to change a data field associated with a particular vertex in the graph data responsive to an operation performed during an analysis of the graph data, the request including a new value for the data field, and for each request:

comparing, by the worker system, the new value with an existing value of the data field associated with the particular vertex in the graph data;

modifying, by the worker system, the data field in the graph data based on the comparison, wherein modifying the graph data does not include modifying backup data for the graph data stored in a backup table; and responsive to modification of the data field in the graph data, storing, by the worker system in a memory of the worker system, a representation of the modified data field in a respective delta table for the request, the respective delta table different than the backup table;

determining, by the worker system, after each request, whether a number of respective delta tables has reached a merge threshold;

in response to determining that the number of respective delta tables has reached the merge threshold:

merging, by the worker system, the backup table and the delta tables to create a new backup table; and replacing, by the worker system, the backup table with the new backup table.

8. The non-transitory computer-readable medium of claim 7, the operations further comprising:

responsive to an additional modification of the data field in the graph data after storing the representation of the modified data field in the delta table, storing an additional representation of the modified data field in an additional delta table.

9. The non-transitory computer-readable medium of claim 7, wherein comparing the new value and modifying the data field are repeated for a plurality of iterations, and the operations further comprising:

storing a representation of the modified data field from each iteration in a different delta table.

10. The non-transitory computer-readable medium of claim 9, wherein storing the representation of the modified data field from each iteration in a different delta table is performed in response to the data field already existing in the delta table.

11. The non-transitory computer-readable medium of claim 9, the operations further comprising:

merging the backup table and the delta tables created in the plurality of iterations after a threshold number of iterations have been completed.

12. The non-transitory computer-readable medium of claim 7, wherein the backup data for the graph data is a copy of the graph data.

13. A system for analyzing graph data representing relationships among items, the graph data including a plurality of vertices connected by one or more edges representing the relationships among items in the graph, each of the vertices associated with one or more data fields, comprising:

memory for storing data; and one or more processors operable to perform operations comprising:

identifying requests by a worker system in a distributed computing system including a plurality of workers systems to which the graph data is partitioned, each request to change a data field associated with a particular vertex in the graph data responsive to an operation performed during an analysis of the graph data, the request including a new value for the data field, and for each request:

comparing, by the worker system, the new value with an existing value of the data field associated with the particular vertex in the graph data;

modifying, by the worker system, the data field in the graph data based on the comparison, wherein modifying the graph data does not include modifying backup data for the graph data stored in a backup table; and responsive to modification of the data field in the graph data, storing, by the worker system in a memory of the worker system, a representation of the modified data field in a respective delta table for the request, the respective delta table different than the backup table;

determining, by the worker system, after each request, whether a number of respective delta tables has reached a merge threshold;

in response to determining that the number of respective delta tables has reached the merge threshold:

merging, by the worker system, the backup table and the delta tables to create a new backup table; and replacing, by the worker system, the backup table with the new backup table.

14. The system of claim 13, the operations further comprising:

responsive to an additional modification of the data field in the graph data after storing the representation of the modified data field in the delta table, storing an additional representation of the modified data field in an additional delta table.

15. The system of claim 13, wherein comparing the new value and modifying the data field are repeated for a plurality of iterations, and the operations further comprising:

storing a representation of the modified data field from each iteration in a different delta table.

16. The system of claim 15, wherein storing the representation of the modified data field from each iteration in a different delta table is performed in response to the data field already existing in the delta table.

17. The system of claim 15, the operations further comprising:

merging the backup table and the delta tables created in the plurality of iterations after a threshold number of iterations have been completed.

* * * * *